(12) United States Patent
Adachi et al.

(10) Patent No.: US 8,906,469 B2
(45) Date of Patent: Dec. 9, 2014

(54) COATING METHOD USING PLASMA SHOCK WAVE AND METHOD FOR MANUFACTURING COATED SUBSTANCE

(75) Inventors: Takafumi Adachi, Tokyo (JP); Hiroyuki Takehisa, Tokyo (JP); Yuji Sano, Yokosuka (JP); Itaru Chida, Kawasaki (JP)

(73) Assignee: Fuji Jukogyo Kabushiki Kaisha Toshiba Corporation, Tokyo (JP)

( * ) Notice: Subject to any disclaimer, the term of this patent is extended or adjusted under 35 U.S.C. 154(b) by 1228 days.

(21) Appl. No.: 12/555,433

(22) Filed: Sep. 8, 2009

(65) Prior Publication Data

US 2010/0062179 A1    Mar. 11, 2010

(30) Foreign Application Priority Data

Sep. 9, 2009 (JP) ................ 2008-231025

(51) Int. Cl.
| | |
|---|---|
| H05H 1/00 | (2006.01) |
| B05D 3/02 | (2006.01) |
| C08J 7/18 | (2006.01) |
| C05D 3/00 | (2006.01) |
| B23K 26/00 | (2014.01) |
| B23K 26/02 | (2014.01) |
| D06N 7/00 | (2006.01) |
| D06N 7/04 | (2006.01) |
| G03B 21/62 | (2014.01) |
| B32B 15/00 | (2006.01) |
| C23C 24/08 | (2006.01) |
| B23K 26/34 | (2014.01) |
| C23C 24/04 | (2006.01) |
| C23C 4/18 | (2006.01) |
| C23C 26/00 | (2006.01) |

(52) U.S. Cl.
CPC ............... *C23C 26/00* (2013.01); *C23C 24/08* (2013.01); *B23K 26/34* (2013.01); *C23C 24/04* (2013.01); *C23C 4/18* (2013.01)
USPC .......... 427/554; 427/535; 427/379; 427/532; 219/121.85; 219/121.83; 428/147; 428/143; 428/149; 428/379

(58) Field of Classification Search
None
See application file for complete search history.

(56) References Cited

U.S. PATENT DOCUMENTS

| 4,732,778 A | 3/1988 | Kawasaki | |
|---|---|---|---|
| 5,131,957 A * | 7/1992 | Epstein et al. | 148/565 |

(Continued)

FOREIGN PATENT DOCUMENTS

| JP | 53-001642 A | 1/1978 |
|---|---|---|
| JP | 5-125557 A | 5/1993 |

(Continued)

OTHER PUBLICATIONS

Translation of JP 2007-169753.* European Search Report dated Nov. 23, 2010 for Application No. EP 09 16 9799.
Japanese Office Action mailed Nov. 20, 2012 for Japanese Application No. 2008-231025.

(Continued)

*Primary Examiner* — Guinever Gregorio
(74) *Attorney, Agent, or Firm* — Smith, Gambrell & Russell LLP (57) ABSTRACT

Disclosed is a coating method using a plasma shock wave, the method including the steps of: irradiating a pulse laser to a first surface of a mixed layer obtained by mixing powders and resin to generate a plasma, the mixed layer being formed on a second surface of a substance to be coated; striking the powders on the second surface by using a shock wave of the plasma; and forming a coat of the powders on the second surface.

23 Claims, 10 Drawing Sheets

(56) References Cited

U.S. PATENT DOCUMENTS

| | | | |
|---|---|---|---|
| 5,614,339 A * | 3/1997 | Tankovich | 430/19 |
| 5,741,559 A * | 4/1998 | Dulaney | 427/554 |
| 5,750,205 A * | 5/1998 | Shashkovsky et al. | 427/535 |
| 5,961,861 A | 10/1999 | McCay et al. | |
| 5,985,056 A | 11/1999 | McCay et al. | |
| 6,049,058 A | 4/2000 | Dulaney et al. | |
| 6,197,133 B1 | 3/2001 | Unternahrer et al. | |
| 6,350,326 B1 | 2/2002 | McCay et al. | |
| 6,747,240 B2 * | 6/2004 | Tenaglia et al. | 219/121.6 |
| 6,994,635 B2 * | 2/2006 | Poynor | 473/324 |
| 7,137,282 B2 * | 11/2006 | Westley et al. | 72/53 |
| 7,861,573 B1 | 1/2011 | Tenaglia et al. | |
| 7,868,268 B1 * | 1/2011 | Tenaglia et al. | 219/121.6 |
| 2009/0314824 A1 | 12/2009 | Sawaguchi | |

FOREIGN PATENT DOCUMENTS

| | | |
|---|---|---|
| JP | 2000-246468 | 9/2000 |
| JP | 2001-527601 | 12/2001 |
| JP | 2002-346847 | 12/2002 |
| JP | 2002346847 | 12/2002 |
| JP | 2007-169753 | 12/2005 |
| JP | 2006-122969 | 5/2006 |
| JP | 2006122969 | 5/2006 |
| JP | 2006-320907 A | 11/2006 |
| JP | 2007169753 | 7/2007 |
| WO | 2008/090662 | 7/2008 |

OTHER PUBLICATIONS

Menig, et al., "Shot Peening, Comparison of Surface Characteristics and Thermal Residual Stress Relaxation of Laser Peened and Shot Peened AISI 4140", pp. 498-504, 2002.

Carey, et al., "Effects of Laser Interaction with Graphite Coatings", Laser Assisted Net Shape Engineering 5, pp. 673-686, 2007.

Niehoff, et al., "Laser Induced Shock Waves in Deformation Processing", Metalurgija—Journal of Metallurgy, vol. 11, pp. 183-194, 2005.

Edwards, et al., "Laser Micro Peen Forming Without a Tamping Layer", IJAM—International Journal of Advanced Manufacturing, Jul. 12, pp. 1-10, 2009.

Sano, et al., "Laser Peening without Coating as a Surface Enhancement Technology", JLMN—Journal of Laser Micro/Nanoengineering vol. 1, No. 3, 2006, pp. 161-166.

Wojciech Napadlek, "Laser Percussive Strengthening of the Aluminum Alloys", Journal of Kones Powertrain and Transport, vol. 18, No. 1, 2011, pp. 373-384.

Y.B. Guo, "Laser Shock Peening: Modeling, Simulations and Applications", Numerical Simulations —Applications, Examples and Theory, 2011, pp. 331-354.

Allan Clauer, "Laser Shock Peening for Fatigue Resistance", Surface Performance of Titanium, 1996, pp. 217-230.

Vollertsen, et al., "State of the Art of Laser Hardening and Cladding", Proceedings of the Third International WLT-Conference in Manufacturing, 2005, pp. 1-22.

* cited by examiner

A: PARTICLE (POWDER) COLLISION SPEED AND TEMPERATURE ACCORDING TO AN EMBODIMENT OF THE PRESENT INVENTION

COATING METHOD USING PLASMA SHOCK WAVE AND METHOD FOR MANUFACTURING COATED SUBSTANCE

BACKGROUND OF THE INVENTION

1. Field of the Invention

The present invention relates to a coating method using a plasma shock wave and a method for manufacturing a coated substance.

2. Description of Related Art

Heretofore, a laser peening method is used as a method using a plasma shock wave for reforming surfaces of such as machinery parts by applying residual stress into the surfaces.

Processing that uses the laser peening method is generally taken place by irradiating convergent laser beam to a surface to be worked, trapping produced plasma into a liquid medium such as water, oil, or the like, the liquid medium being formed on the surface to be worked, and applying a shock wave pressure generated thereby to the surface to be worked. Liquid such as water, oil, or the like for trapping plasma therein, needs to be formed on the surface to be worked so that the shock wave pressure generated by the plasma may be effectively applied to the surface to be worked.

Patent documents JP-A-2000-246468, JP-A-2006-122969 and JP-A-2007-169753 disclose a laser peening method in which liquid film such as water film or the like is formed on the surface to be worked so that plasma is trapped by the liquid film. Incidentally, according to the documents, a protection film such as black paint or the like is preliminarily applied to the surface to be worked. Moreover, a paragraph 0013 in patent document JP-A-2006-122969 discloses using running water as the water film.

Patent document JP-A-2002-346847 discloses a laser peening method, which is taken place with a laser radiation head and a surface to be worked being placed in the water (see paragraph 0004, FIGS. 10 and 11 in the document).

Moreover, the document discloses a peening method using a water-jet in combination with a laser (see the CLAIMS and FIG. 1 and so on).

Moreover, patent document JP-A-2007-169753 discloses a laser peening method in which a powder is struck into a surface to be worked by a shock wave of plasma generated when irradiating a laser.

According to the laser peening method, the powder is struck into the surface to be worked by irradiating the laser to a base sheet laid down on the surface to be worked, the base sheet preliminarily been made to carry the powder on one side thereof (see paragraphs 0040-0044 and FIG. 1 in the document JP-A-2007-169753). As a result, the surface to be worked in which the powder is implanted is obtained. In this way, reduction of slide friction and improvement of an anti-wear characteristic are aimed (see paragraphs 0045-0046 and FIG. 2 in the document JP-A-2007-169753).

However, the technique disclosed in the patent document JP-A-2007-169753 is a technique, which is not for forming a coating but for implanting the powder sporadically into the surface to be worked. Moreover, equipments cannot help but being large-scaled because huge amount of energy is needed for implanting the powder (see paragraph 0043 and 0047 in the document).

As a coating technology, a thermal spraying including a flame spraying, a burst spraying, an electrical spraying such as an arc spraying and a plasma spraying or the like, a high-speed flame spraying (HVOF) or a cold spraying is used.

SUMMARY OF THE INVENTION

It is, therefore, a main object of the present invention to provide a coating method for forming a coating by using the plasma shock wave and a method for manufacturing a coated substance. Moreover, the present invention aims to provide a coating method in which thickness of the coating can be controlled by using a shock wave generated by the plasma. Moreover, the present invention aims to provide a coating method, which forms coating superior in adhesion strength or the like by taking advantage of a laser peening method in which particle collision speed is faster than that of in the thermal spray.

According to a first aspect of the present invention, there is provided a coating method using a plasma shock wave, the method including the steps of: irradiating a pulse laser to a first surface of a mixed layer including a powder and resin to generate a plasma, the mixed layer being formed on a second surface of a substance to be coated; running the powder into the second surface by using a shock wave arisen from the plasma; and forming a coat of the powder on the second surface.

Preferably, irradiating the pulse laser is prosecuted under a condition that the mixed layer is formed on the second surface by hardening the resin after applying an admixture ingredient including the powder and the resin to the second surface.

Preferably, irradiating the pulse laser is prosecuted under a condition that the mixed layer includes two or more different kinds of the powder.

Preferably, irradiating the pulse laser is prosecuted under a condition that the mixed layer is composed of two or more layers, each of the layers including the powder varying from one layer to another.

Preferably, irradiating the pulse laser is prosecuted under a condition that the mixed layer is composed of two or more layers, each of the layers including two or more different kinds of the powder at different blend ratio.

According to a second aspect of the present invention, there is provided a method for manufacturing a coated substance using a plasma shock wave, the method including the steps of: irradiating a pulse laser to a first surface of a mixed layer obtained by mixing powders and resin to generate a plasma, the mixed layer being formed on a second surface of a substance to be coated; striking the powders on the second surface by using a shock wave of the plasma; and forming a coat of the powders on the second surface.

According to the first and second aspects of the present invention, the resin included in the mixed layer has a role to carry the powder. The amount of the powder to be carried on the surface to be worked can be obtained sufficiently per unit area by selecting a blend ratio of the powder and a thickness of the mixed layer. Therefore, the coating composed of the powder can be formed on the second surface by running sufficient amount of the powder into the second surface by the shock wave arisen from the plasma.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

The best mode for carrying out the present invention will be described hereinbelow with reference to the drawings. The followings are embodiments of the present invention, which are not intended to limit the scope of the present invention.

First Embodiment

Figure 1:
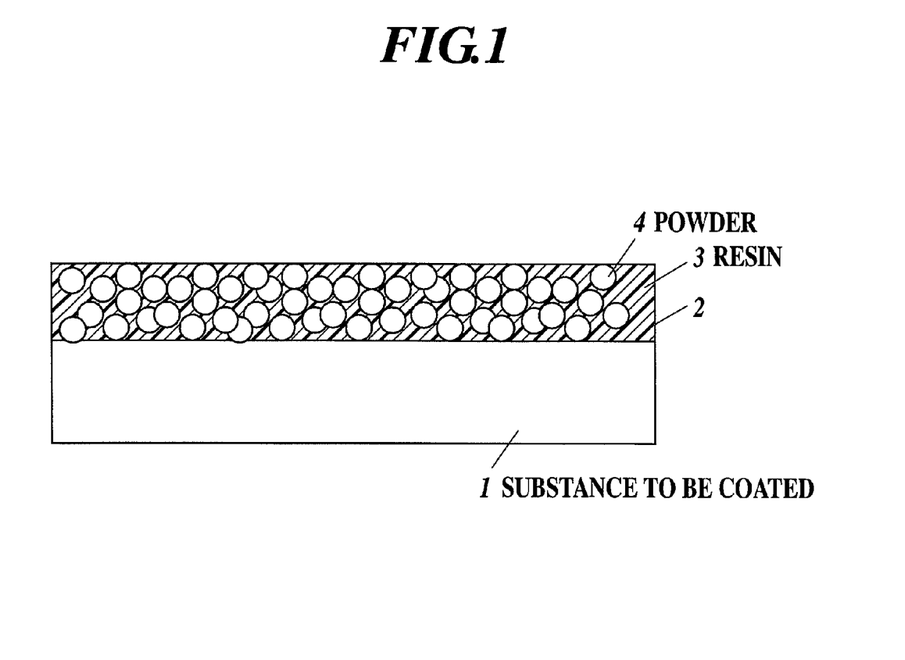
FIG. 1 is a schematic cross-sectional view showing a formation process of a mixed layer according to the first embodiment of the present invention.
Figure 2:
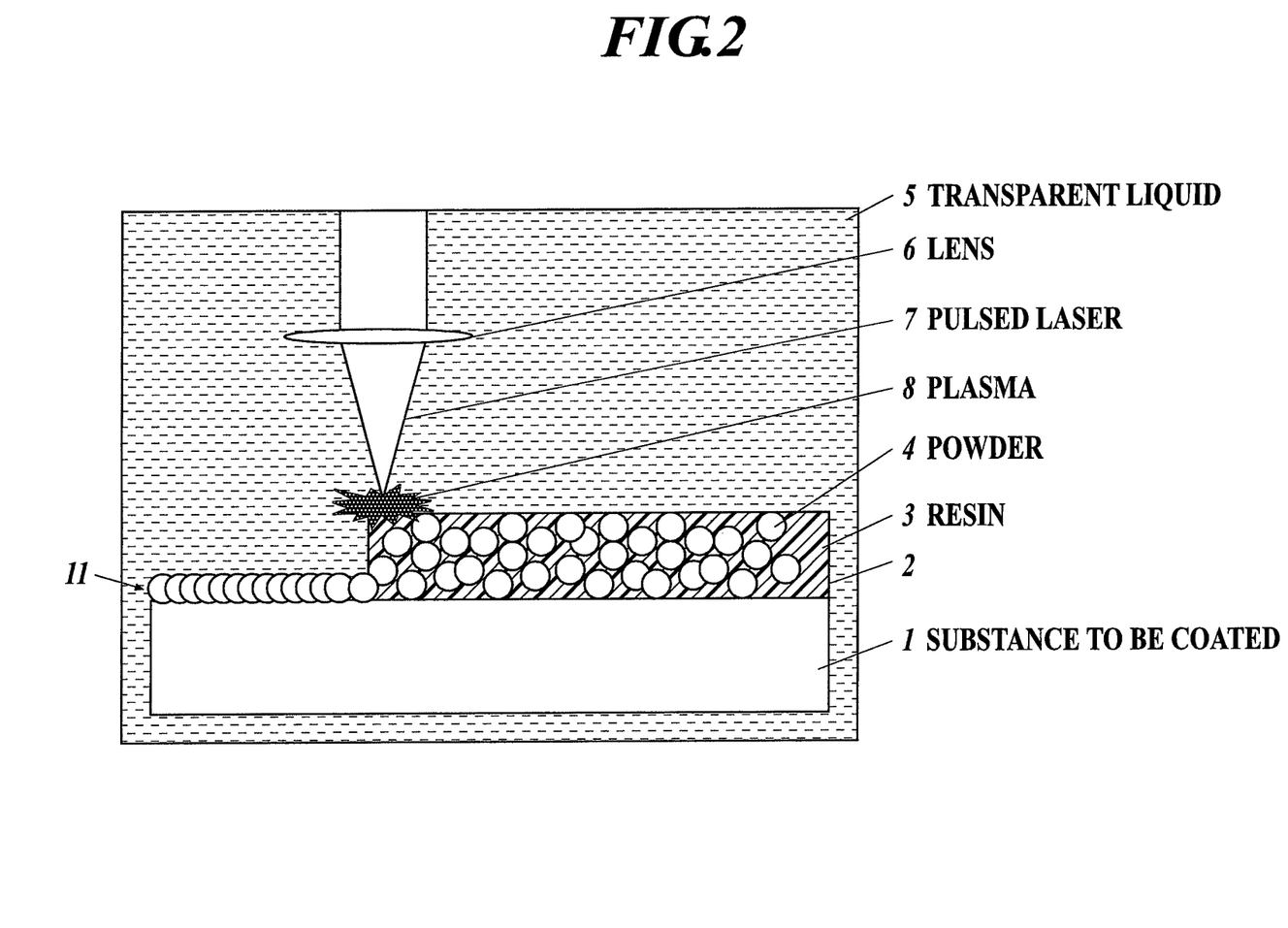
FIG. 2 is a schematic cross-sectional view showing a formation process of a coating according to the first embodiment of the present invention.
Figure 3:
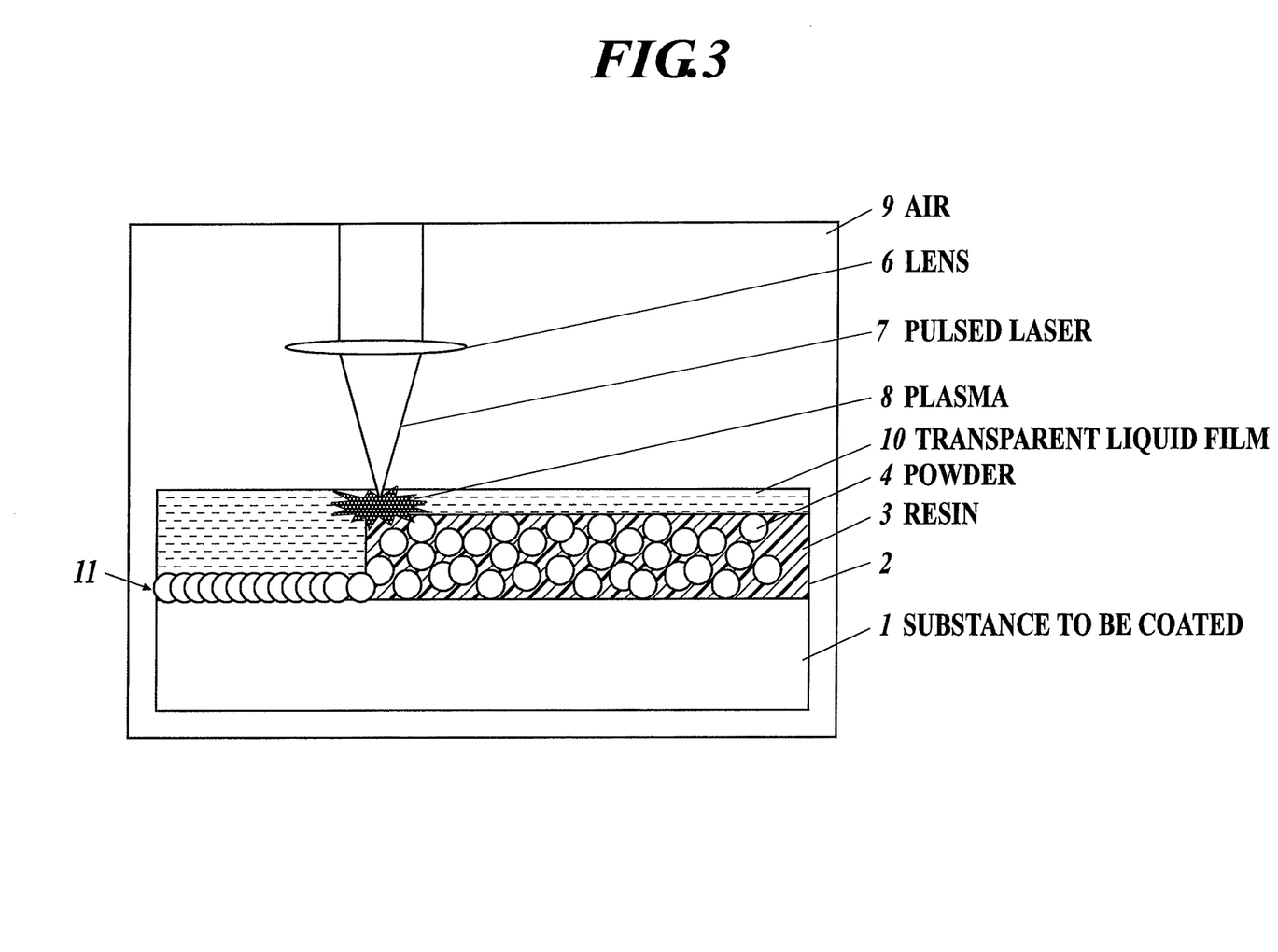
FIG. 3 is a schematic cross-sectional view showing a formation process of a coating according to the first embodiment of the present invention.

First of all, a first embodiment of the present invention will be described with reference to FIGS. 1-4. FIG. 1 is a schematic cross-sectional view showing a formation process of a mixed layer according to the first embodiment of the present invention. FIGS. 2 and 3 are schematic cross-sectional views each showing a formation process of a coating according to the first embodiment of the present invention.

At first, as shown in FIG. 1, a mixed layer 2 including a powder and resin is formed on a surface of a substance 1 to be coated.

The substance 1 is not particularly limited but intended to metal, alloy or ceramic, which constitutes machinery parts, structural parts or industrial tools.

A material of resin 3 that constitutes the mixed layer 2 is preferred to be selected from thermohardening resin that is cured at normal temperature, when heated, or the like, photo-curable resin such as an instantaneously curable resin, visible light curing resin, ultraviolet curable resin, or the like. However, the material affects workability or compatibility with a powder constituting the mixed layer, so the material is preferred to be selected as needed basis.

A material of a powder 4 that constitutes the mixed layer 2 may be selected from resin, metal, intermetallic compound, metallic oxide, metallic carbide, ceramics, glass, cemented carbide, diamond, carbon, carbon nanotube, fullerene, cubic boron nitride, or the like. The material of the powder 4 is preferred to be selected corresponding to compatibility with the substance 1 to be coated or characteristic needed to the coating.

As a method for forming the mixed layer 2 on the surface of the substance 1, first applying a mixed material made by blending the powder 4 into the resin 3 on the surface of the substance 1. A spray used in coating or the like is preferred to be used in applying the mixed material. The mixed layer 2 may be formed on the surface of the substance 1 not by the applying method but by moving a sheet-like mixed layer so as to be placed on the surface of the substance 1. In the present embodiment, the mixed layer 2 is formed by the applying method, so the mixed layer 2 can be easily formed on any area of a surface of an arbitrary shape.

Then, harden the resin 3 in the mixed layer 2 applied on the surface of the substance 1. Hardening the resin 3 before a laser radiation is preferred because retentivity of the resin 3 for trapping the powder 4 is heightened by hardening the resin 3.

Next, as shown in, for example, FIGS. 2 and 3, cover an area of the surface of the mixed layer 2 with a transparent liquid 5, the area being at least an area to which plasma is to be irradiated. Then, radiate and focus a pulsed laser 7 through a lens 6 to the surface of the mixed layer 2 to generate plasma 8. Submerging the substance 1 to which the mixed layer 2 is annexed into the transparent liquid 5, as shown in FIG. 2, or forming a transparent liquid film 10 on the mixed layer 2, as shown in FIG. 3, may be available methods.

Here, water, oil or the like can be applied to the transparent liquid. The transparent liquid film 10 is formed in the form of flowing such as flowing water. In the case that the liquid is thick or semisolid, the film 10 is formed in the form of staying on the surface of the mixed layer 2.

Figure 4:
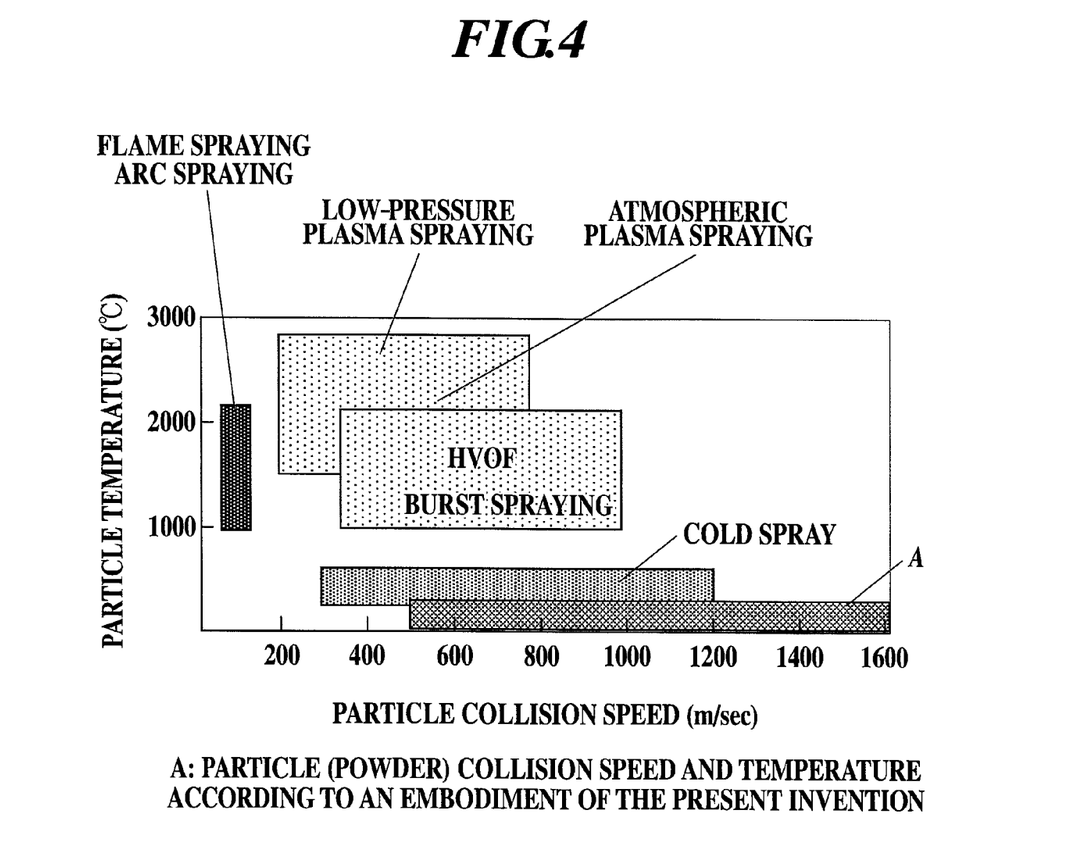
FIG. 4 is a graph showing a comparison result of a particle collision speed and particle temperature between principal thermal spray techniques and those of the present invention.

As described above, a shock wave is arisen by the plasma 8 generated by irradiating the pulsed laser 7. The powder 4 included in the mixed layer 2 is run into the surface of the substance 1 at high velocities by the shock wave. The collision speed varies corresponding to materials of the powder 4 and resin 3, mix ratio of the powder 4 to the resin 3 and irradiance condition of the laser. However, the collision speed is usually faster compared with the thermal spray as shown in FIG. 4. FIG. 4 shows a comparison result of a particle collision speed and particle temperature between principal thermal spray techniques and those of the present invention. In the present embodiment, the particle temperature is preferably set to be within the range from about 20 degrees C., which corresponds to a room temperature, to about 300 degrees C. The preferred particle collision speed in the present embodiment is 500 m/sec or more, and more preferably, about 500 to 1600 m/sec.

By the shock wave of plasma 8, the powder 4 is adhesively-bonded to the surface of the substance 1 with the surface being roughening processed by being plastic deformed to be finely caved, as shown in FIGS. 2 and 3. Moreover, at almost the same time, the powder 4 runs into the bonded powder 4 at high velocities and laminated thereon to form a coating 11. Then, move an irradiation spot of the pulsed laser 7 to form the coating 11 in a needed area.

Thickness of the coating 11 corresponds to the amount of the powder 4 included in the mixed layer 2 to be held on the surface of the substance 1 per unit area. Therefore, the thickness of the coating 11 formed by the plasma 8 can be controlled by selecting blend ratio of the powder 4 and thickness of the mixed layer 2. The coating 11 can be formed with its thickness being within the range of about 5 to 50 μm, though the thickness depends on material or particle diameter of the powder 4.

The inventors of the present invention applied aluminum as the substance 1, epoxy resin as the resin 3 and ceramics powder as the powder 4. The irradiance condition of the pulsed laser is that the pulse energy is from 10 to 80 mJ and the laser is narrowed down to 0.4 to 1 mm by the lens 6. This led to the formation of a ceramics coating having thickness of 5 to 10 μm on the surface of the aluminum member without implanting the powder 4 into the substance 1, thereby having improved an abrasion resistance of the aluminum member.

As described above, according to the coating method of the present invention, a coating having various functions or characteristics such as abrasion resistance or corrosion resistance can be formed on the surface of the substance 1 corresponding to a characteristics of the material of the powder 4.

Moreover, as shown in FIG. 4, it is possible to run the powder 4 into the substance 1 at a particle collision speed faster than that of the thermal spray. Therefore, the coating 11 has high adhesion force to the surface of the substance 1. Moreover, the powder 4 becomes compression solidified by a high pressure of the shock wave, therefore, the coating 11 being highly condensed and having little pores therein can be formed.

Moreover, as shown in FIG. 4, the coating 11 has a little residual stress because the temperature at a time of working and the heat generation thereof are lower than those of in the thermal spray. Moreover, there are no reductions in characteristics of the substance 1 caused by heat load. Consequently, it is possible to form a coating 11 having less decrease in fatigue characteristics thereof even if being compared with the thermal spray.

Second Embodiment

Figure 5:
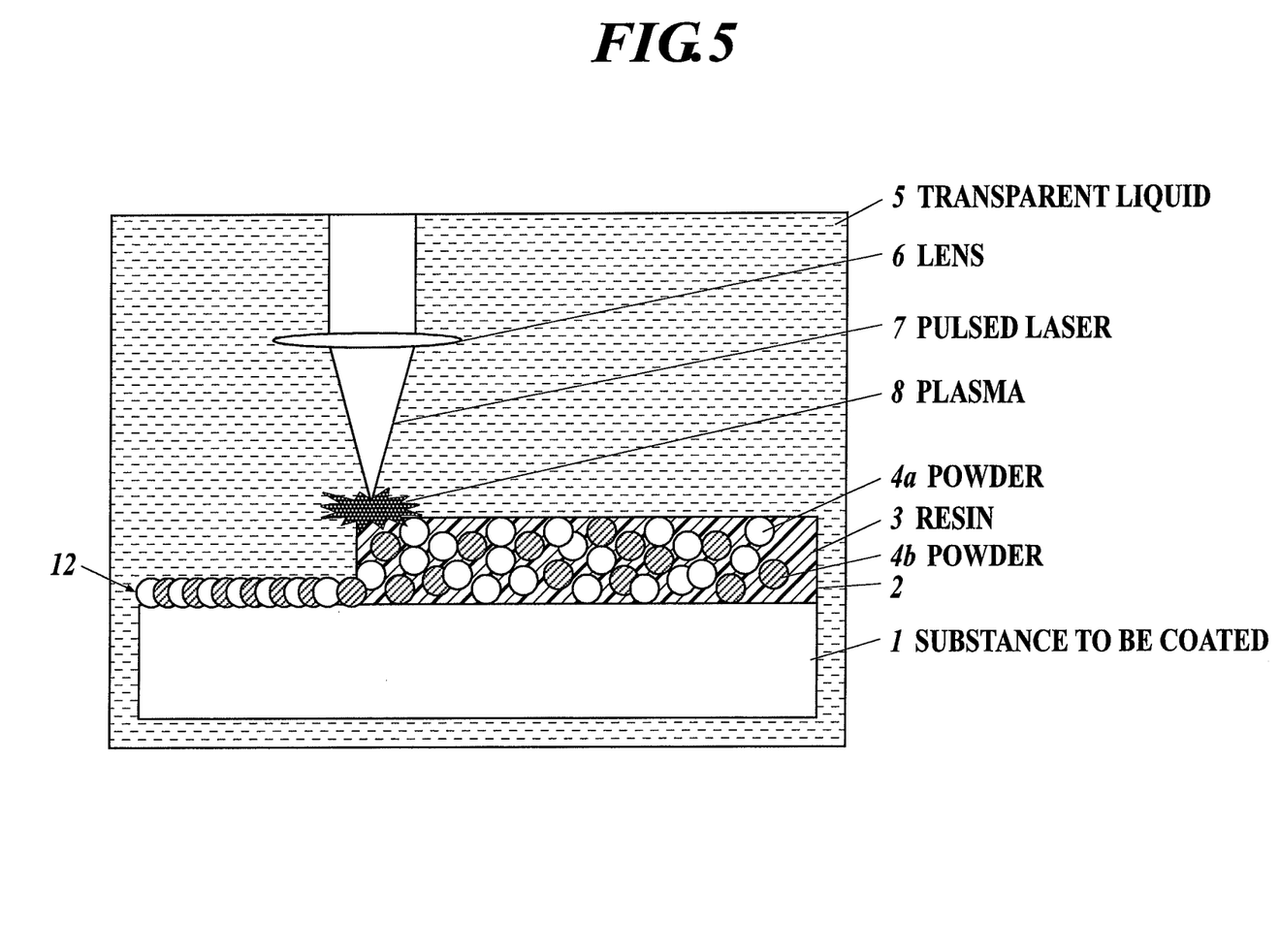
FIG. 5 is a schematic cross-sectional view showing a formation process of a coating according to a second embodiment of the present invention.
Figure 6:
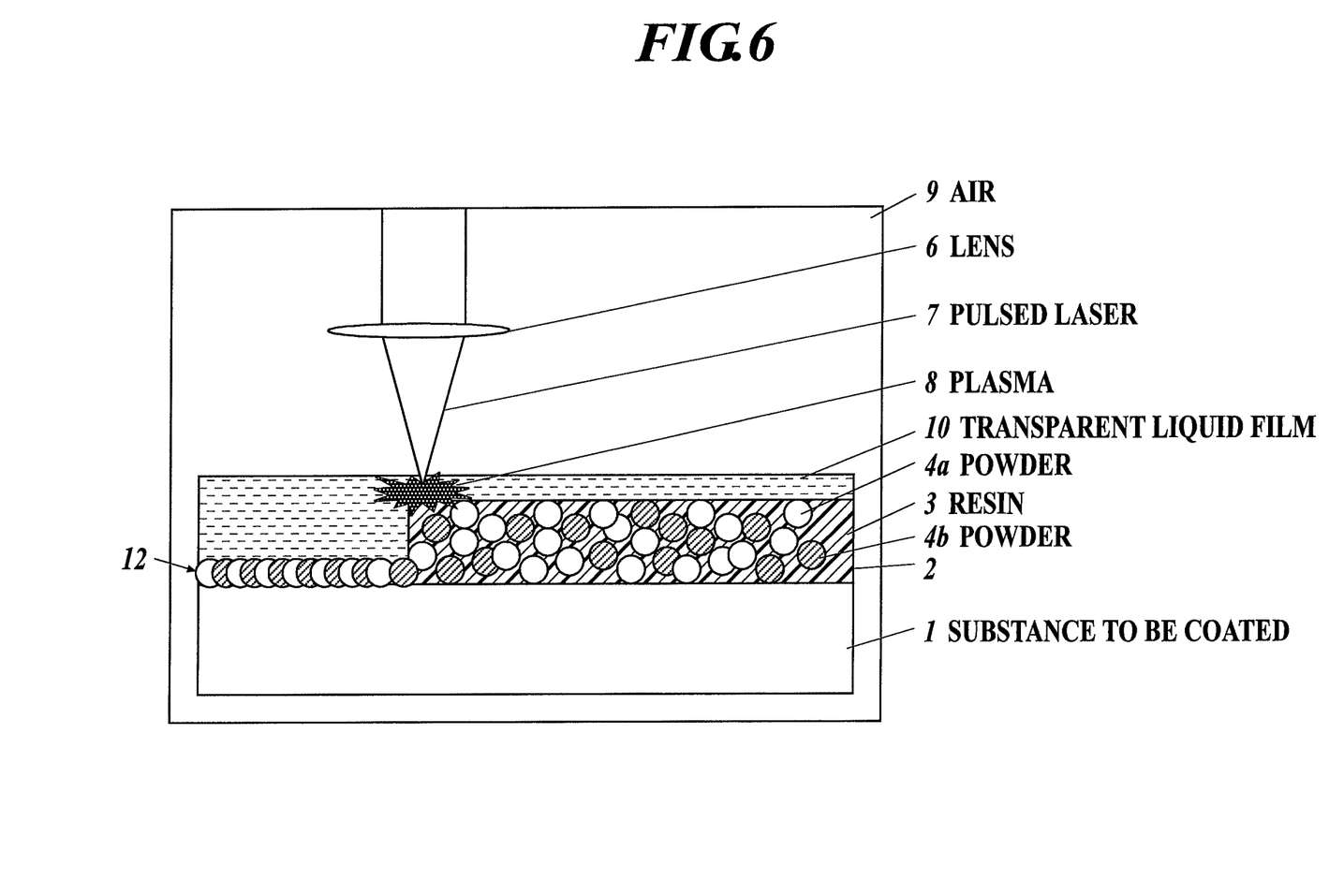
FIG. 6 is a schematic cross-sectional view showing a formation process of a coating according to the second embodiment of the present invention.

Next, a second embodiment of the present invention will be described with reference to FIGS. 5 and 6. FIGS. 5 and 6 are schematic cross-sectional views each showing a formation process of a coating according to the second embodiment of the present invention. The method of the present embodiment differs from the first embodiment in that the powder 4 includes two kinds of powders 4a and 4b. The other points are the same as that of the first embodiment.

Apply a material composed by mixing the resin 3 and two kinds of powders 4a and 4b on the surface of the substance 1, and then cure the resin 3. The mixed layer 2 includes two kinds of powders 4a and 4b.

Next, as shown in FIG. 5 or FIG. 6, irradiate the pulsed laser 7 in the same manner as the first embodiment with the mixed two kinds of powders 4a and 4b being included in the mixed layer 2. The plasma 8 arises because of the radiation of the pulsed laser 7. Then, a shock wave of the plasma 8 runs the powders 4a and 4b into the surface of the substance 1 at high velocities to form a coating 12. Then, move an irradiation spot of the pulsed laser 7 to form the coating 12 in a needed area.

As shown in FIGS. 5 and 6, the coating 12 including two kinds of materials (material of the powder 4a and material of the powder 4b) is formed. That is, the coating 12 having multiple functions or characteristics can be formed. Off course, three or more kinds of powders may be mixed in the resin 3.

Third Embodiment

Figure 7:
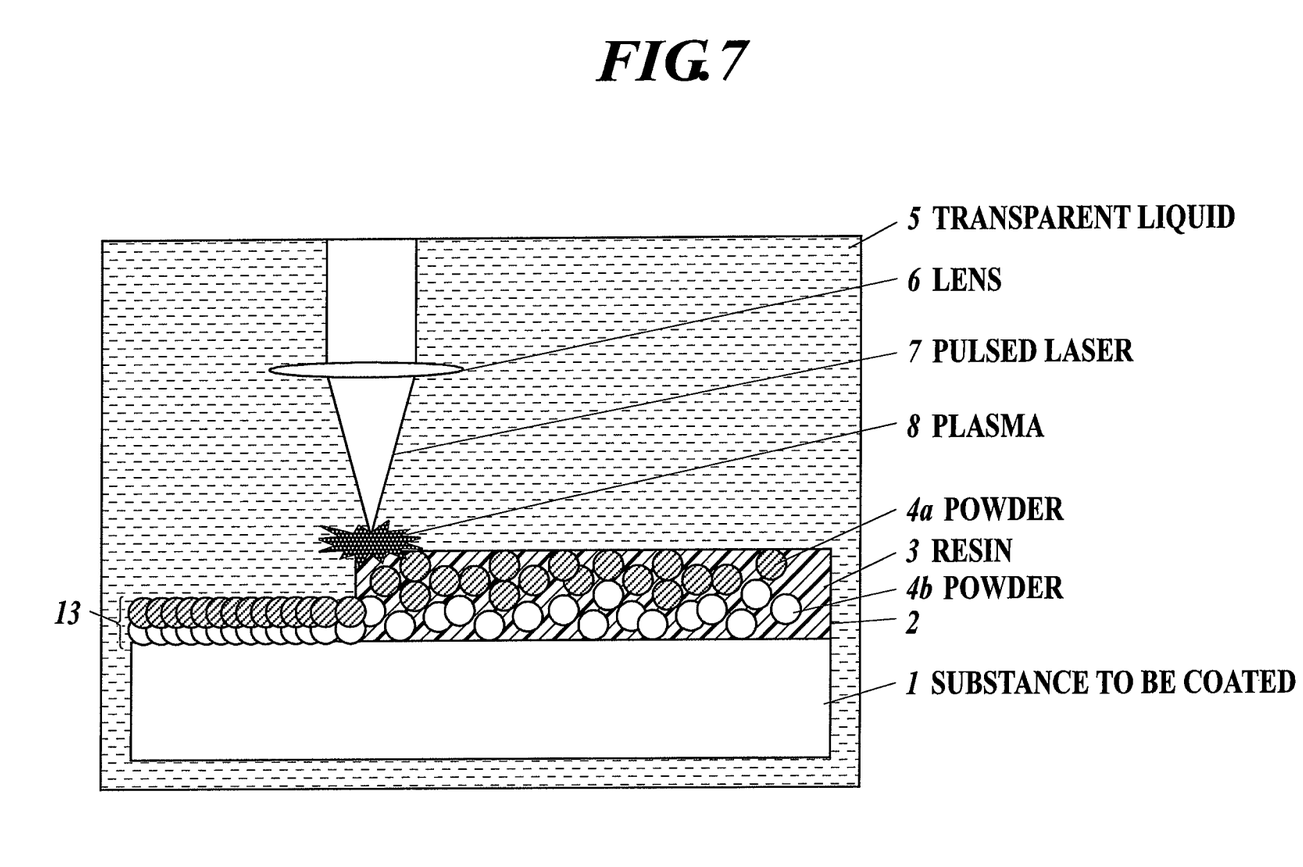
FIG. 7 is a schematic cross-sectional view showing a formation process of a coating according to a third embodiment of the present invention.
Figure 8:
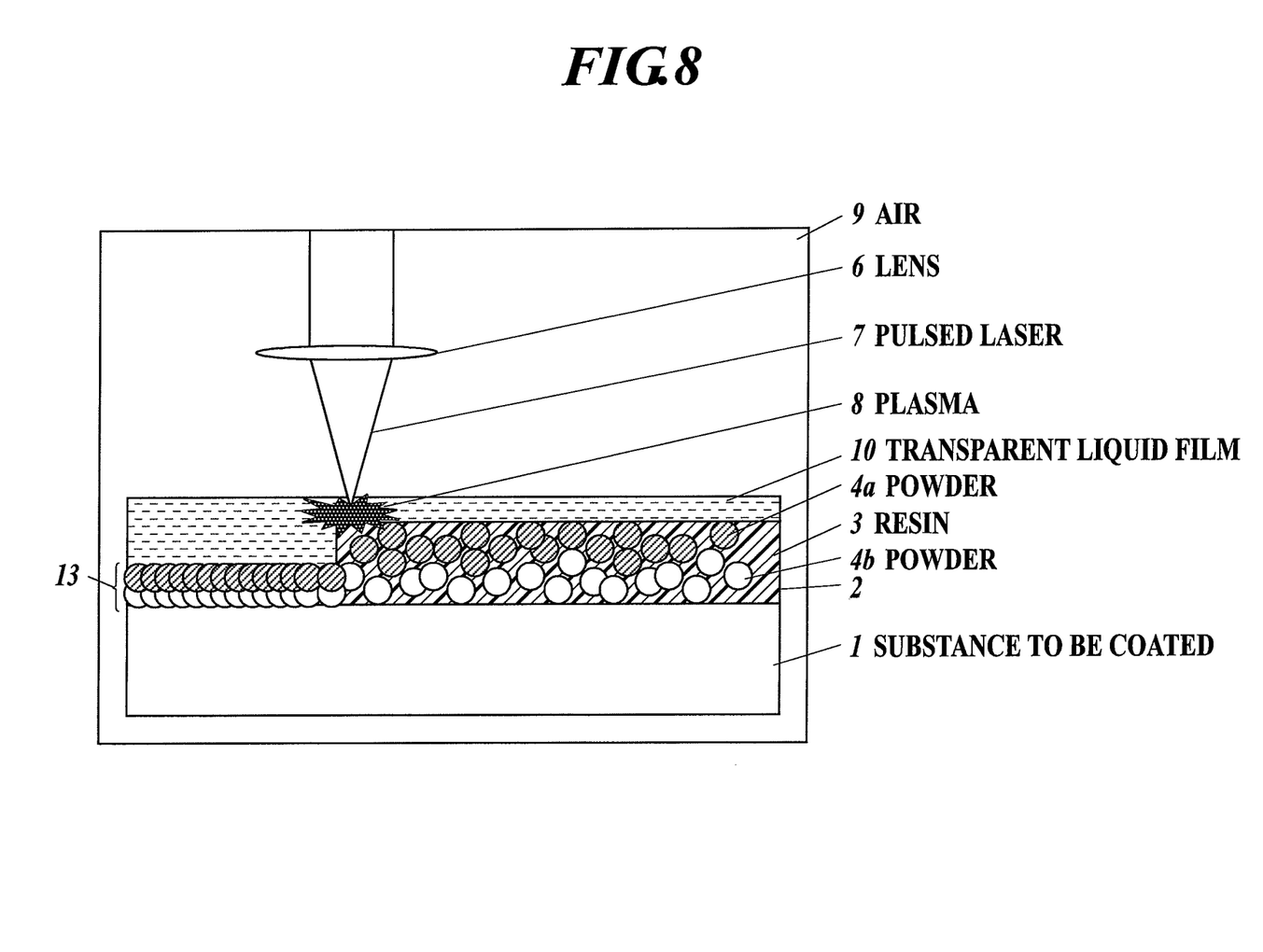
FIG. 8 is a schematic cross-sectional view showing a formation process of a coating according to the third embodiment of the present invention.

Next, a third embodiment of the present invention will be described with reference to FIGS. 7 and 8. FIGS. 7 and 8 are schematic cross-sectional views each showing a formation process of a coating according to the third embodiment of the present invention. The method of the present embodiment differs from the second embodiment in that the mixed layer being two-layered. The other points are the same as that of the second embodiment.

Apply a material composed by mixing the resin 3 and powder 4b on the surface of the substance 1, and cure the applied resin 3. Then, on top thereof, apply a material composed by mixing the resin 3 and powder 4a to form two-layered mixed layer 2, and cure the applied resin 3.

The powders 4a and 4b are different kinds of materials. Depending on a difference of characteristics between the powders 4a and 4b, the resin 3 to be mixed with the powder 4a may be different from the resin 3 to be mixed with the powder 4b, or may be the same as the resin 3 to be mixed with the powder 4b.

As shown in FIGS. 7 and 8, the powder 4b is arranged in a lower layer of the two-layered mixed layer 2 and the powder 4a is arranged in an upper layer of the two-layered mixed layer 2.

Next, as shown in FIGS. 7 and 8, irradiate the pulsed laser 7 in the same manner as the first embodiment with the mixed two kinds of powders 4a and 4b separately being arranged in the upper and the lower layers in the two-layered mixed layer 2. The plasma 8 arises because of the radiation of the pulsed laser 7. Then, a shock wave of the plasma 8 runs the powders 4a and 4b into the surface of the substance 1 at high velocities, and the powder 4a runs into the powder 4b to be pressed to form a coating 13. Then, move an irradiation spot of the pulsed laser 7 to form the coating 13 in a needed area.

At this time, if the process is carried out by a big pulse energy that can implant the powder 4b into the substance 1, the powders 4a and 4b becomes mixed. Therefore, it is preferred that the process is accomplished at pulse energy lower than a pulse energy disclosed in the patent document 4. For example, set the pulse energy from 10 to 80 mJ and narrow down the laser to 0.4 to 1 mm by the lens 6. This can lead to the formation of the two-layered coating 13, in which material of powder 4b is arranged in relatively lower layer and material of powder 4a is arranged in relatively upper layer, as shown in FIGS. 7 and 8.

According to the present embodiment, for example, by applying aluminum as the substance 1, carbon as the powder 4a and ceramics as the powder 4b, ceramics intermediate between aluminum and carbon. Consequently, carbon coating, which is incompatible with aluminum, can be formed on an outer surface of an aluminum member. It is possible to form a coating of material, which is not suitable to be directly formed on the substance 1 for a chemical reason or a mechanical reason such as thermal stress. It is also possible to obtain multiple functions or characteristics of a two-layered coating composed of two different materials. Needless to say, the mixed layer 2 may have a three-layered structure or more.

The two-layered coating composed of different materials can be formed by repeating the above-mentioned steps of the first embodiment twice. In contrast, the present embodiment has an advantage from the viewpoint of manufacturing step because the two-layered coating can be formed by one step of laser radiation. Moreover, by properly controlling conditions of laser to radiate such as a pulse energy or radiation diameter, interlayer mixing degree can be controlled and so-called gradient function can be realized.

Fourth Embodiment

Figure 9:
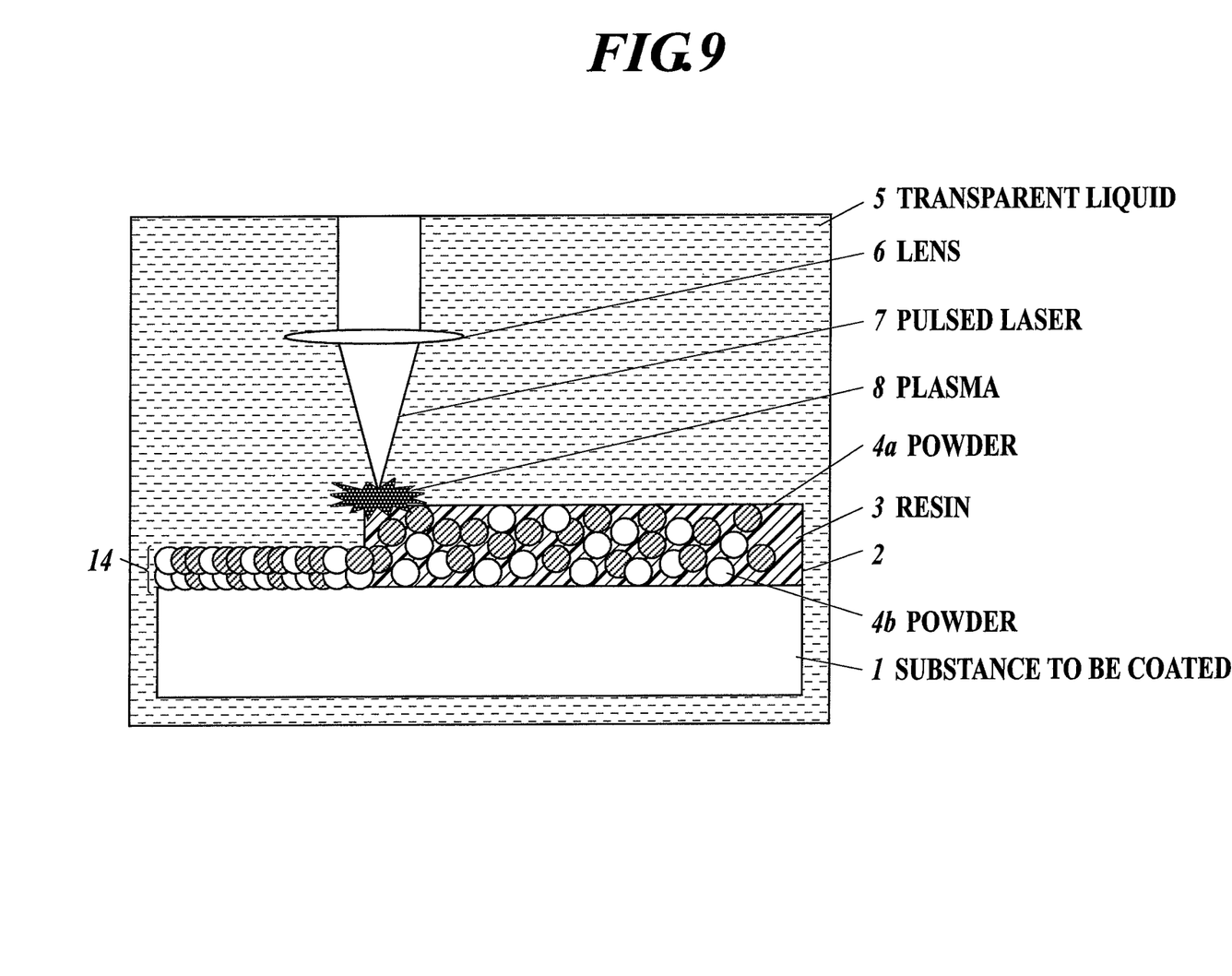
FIG. 9 is a schematic cross-sectional view showing a formation process of a coating according to a fourth embodiment of the present invention.
Figure 10:
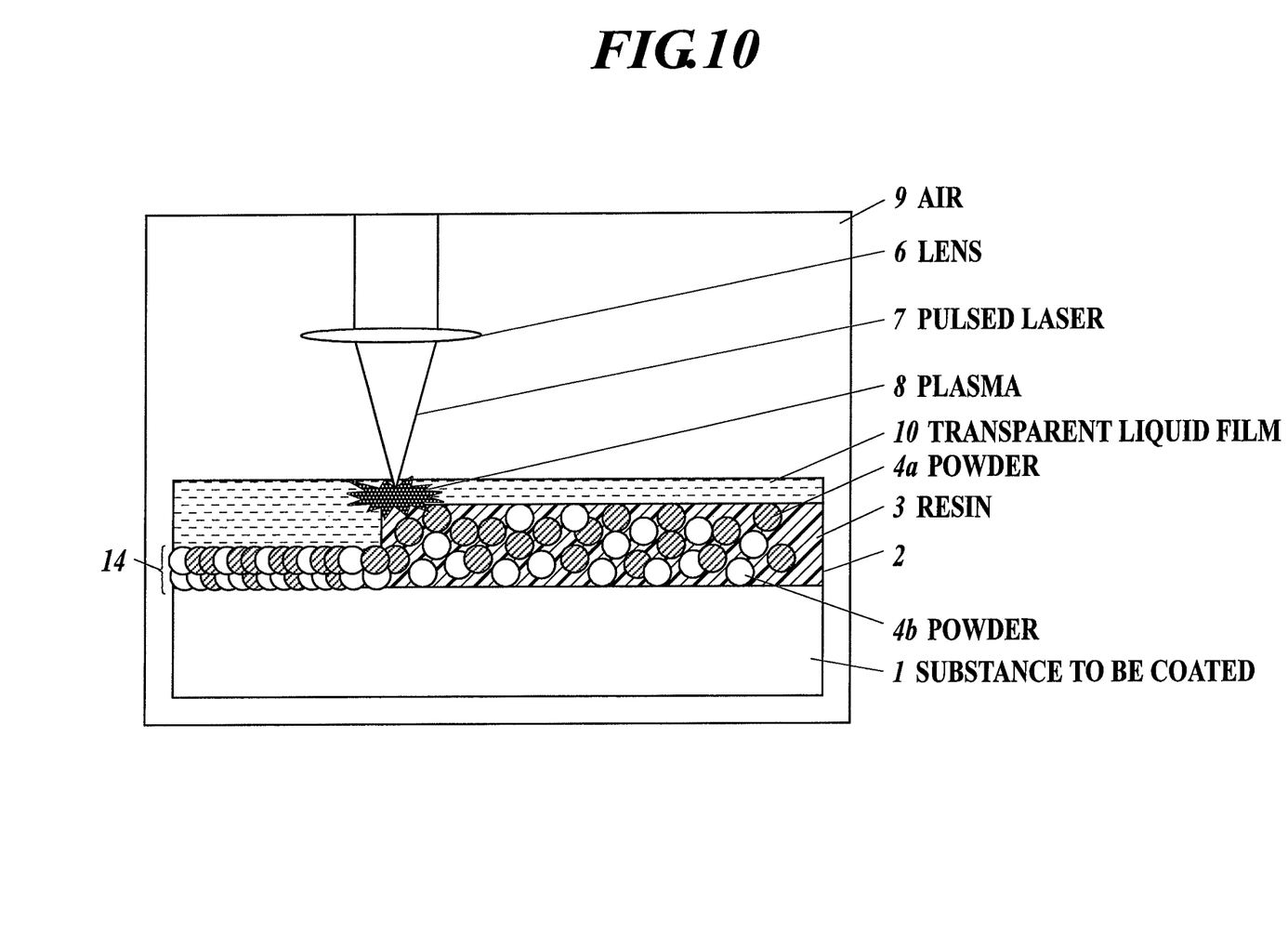
FIG. 10 is a schematic cross-sectional view showing a formation process of a coating according to the fourth embodiment of the present invention.

As an application of the above-mentioned second and third embodiments, as shown in FIGS. 9 and 10, a coating 14, in which an upper layer and a lower layer respectively includes mixed materials of powders 4a and 4b with the blend ratio thereof varies between the upper layer and the lower layer, can be formed. At this time, the number of layers, a blend ratio in each of the layers, and a kind of powder or the number of kinds of the powders to be mixed in each of the layers are arbitrary. A layer including one kind of powder may arbitrary be added on top of or under a layer including two or more kinds of mixed powders.

FIGS. 9 and 10 show an example of forming the coating 14 in which a layer including materials of powders 4a and 4b in the proportion of two parts to one is arranged on top of a layer including materials of powders 4a and 4b in the proportion of one part to two. Method of formation will be described with taking the FIGS. 9 and 10 as an example. First, apply a material, in which powders 4a and 4b in the proportion of one part to two are mixed in the resin 3, to the surface of the substance 1 and cure the applied resin 3. Then, to the top thereon, a material, in which powders 4a and 4b in the proportion of two parts to one are mixed in the resin 3 is applied to form two-layered mixed layer 2. Cure the applied resin 3. Then, irradiate the pulsed laser 7 in the same manner as aforementioned. As described above, the pulsed laser is irradiated under the condition that the mixed layer 2 including two or more layers, each of which includes two or more kinds of powders at different blend ratio at each of the layers, are formed.

By forming two-layered mixed layer 2 including two layers each of which having different blend ratio of the different powders in each layer, a coating having different blend ratio of materials in each layer can be formed. In the example shown in FIGS. 9 and 10, the two-layered coating 14, in which the layer having high blend ratio of powder 4b is arranged relatively low and the layer having high blend ratio of powder 4a is arranged relatively high, can be formed. It may be possible to form the coating to be three or more layered and provide continuous ratio changing by slightly varying the blend ratio. It may also be possible to provide discontinuous ratio changing by greatly varying the blend ratio between adjacent layers.

It may be possible that the coating characteristics vary continuously or discontinuously in a stepwise fashion or the like as departing from the surface of the substance 1, and that constituent material or characteristic of the coating has a depth variation such as, for example, change characteristics that increase gradually or decrease gradually at a slant corresponding to the depth.

The entire disclosure of Japanese Patent Application No. 2008-231025 filed on Sep. 9, 2008 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A coating method using a plasma shock wave, the method comprising the steps of:
   irradiating a pulse laser to a first surface of a mixed layer comprising a powder blended with resin to generate a plasma, the mixed layer being arranged on a second surface of a substance to be coated;
   striking the powders against the second surface by using a shock wave of the plasma; and
   forming a coat of the powders on the second surface, the coat of the powders comprising powders that were stricken against the second surface by the shock wave of the plasma.

2. The coating method according to claim 1, wherein irradiating the pulse laser is prosecuted under a condition that the mixed layer includes two or more different kinds of the powders.

3. The coating method according to claim 2, wherein irradiating the pulse laser is prosecuted under a condition that the mixed layer comprises two or more layers, with each of the two or more layers including two or more different kinds of powders at different blend ratios, and the two or more powders from each layer are coated onto the second surface.

4. The coating method according to claim 2, wherein the pulse laser is applied with a pulse energy in a range from 10 to 80 mJ.

5. The coating method according to claim 1, wherein irradiating the pulse laser is prosecuted under a condition that the mixed layer comprises two or more layers, with each layer including a powder of a different kind, and the powder from each layer is coated onto the second surface.

6. The coating method according to claim 5, wherein the pulse laser is applied with a pulse energy in a range from 10 to 80 mJ.

7. The coating method according to claim 1, wherein irradiating the pulse laser is prosecuted under a condition that the mixed layer comprises a vertically layered arrangement of the powder within the resin.

8. The coating method according to claim 1, wherein the coat of the powders formed on the second surface is a substantially continuous coat over an area of the second surface corresponding to an area over which the irradiation spot of the pulsed laser is moved.

9. The method according to claim 1, wherein prior to irradiating the pulse laser to the first surface, the resin in the mixed layer is hardened such that the second surface contacts hardened resin.

10. A coating method using a plasma shock wave, the method comprising the steps of:
    irradiating a pulse laser to a first surface of a mixed layer to generate a plasma, the mixed layer comprising a mix of powders and resin and being formed on a second surface of a substance to be coated;
    striking the powders on the second surface by using a shock wave of the plasma to thereby form a coat of the powders on the second surface, wherein
    prior to irradiating the pulse laser to the first surface of the mixed layer, the resin in the mixed layer is in a hardened state such that the second surface of the substance to be coated contacts hardened resin.

11. The coating method according to claim 10, wherein irradiating the pulse laser is prosecuted under a condition that the mixed layer comprises a vertically layered arrangement of the powder within the resin.

12. The coating method according to claim 10, wherein the mixed layer is obtained by blending the powders with the resin.

13. The coating method according to claim 10, wherein the coat of the powders formed on the second surface is a substantially continuous coat over an area of the second surface corresponding to an area over which the irradiation spot of the pulsed laser is moved.

14. The method of claim 10, further comprising a step of hardening the resin in the mixed layer.

15. A method for manufacturing a coated substance using a plasma shock wave, the method comprising the steps of:
    positioning a mixed layer in a path of a pulse laser, the mixed layer comprising a powder blended with resin and being arranged on a surface of a substance to be coated;
    irradiating the pulse laser to a surface of the mixed layer to generate a plasma;

striking the powders of the mixed layer against the surface of the substance to be coated by using a shock wave of the plasma to thereby form a coat of the powders on the surface of the substance to be coated.

16. The method according to claim 15, further comprising a step of forming the mixed layer on the surface of the substance to be coated by hardening the resin after applying an admixture ingredient including the powders and the resin to the surface of the substance to be coated.

17. The method according to claim 15, wherein
irradiating the pulse laser is prosecuted under a condition that the mixed layer includes two or more different kinds of the powders.

18. The method according to claim 17, wherein
irradiating the pulse laser is prosecuted under a condition that the mixed layer comprises two or more layers, with each of the two or more layers including two or more different kinds of powders at different blend ratios, and
the two or more powders from each layer are coated onto the surface of the substance to be coated.

19. The method according to claim 17, wherein
the pulse laser is applied with a pulse energy in a range from 10 to 80 mJ.

20. The method according to claim 15, wherein
irradiating the pulse laser is prosecuted under a condition that the mixed layer comprises two or more layers, with each layer including a powder of a different kind, and
the powder from each layer is coated onto the surface of the substance to be coated.

21. The method according to claim 15, wherein
irradiating the pulse laser is prosecuted under a condition that the mixed layer comprises a vertically layered arrangement of the powder within the resin.

22. The method according to claim 15, wherein
the coat of the powders formed on the surface of the substance to be coated is a substantially continuous coat over an area of the surface of the substance to be coated corresponding to an area over which the irradiation spot of the pulsed laser is moved.

23. The method according to claim 15, wherein
prior to irradiating the pulse laser to the surface of the mixed layer, the resin in the mixed layer is hardened such that the surface of the substance to be coated contacts hardened resin.

\* \* \* \* \*